(12) United States Patent
Chang

(10) Patent No.: US 8,181,011 B1
(45) Date of Patent: May 15, 2012

(54) ISCSI NAME FORWARDING TECHNIQUE

(75) Inventor: Ian Chang, San Jose, CA (US)

(73) Assignee: NetApp, Inc., Sunnyvale, CA (US)

(*) Notice: Subject to any disclaimer, the term of this patent is extended or adjusted under 35 U.S.C. 154(b) by 1245 days.

(21) Appl. No.: 11/508,432

(22) Filed: Aug. 23, 2006

(51) Int. Cl.
*H04L 29/06* (2006.01)

(52) U.S. Cl. ........ 713/152; 713/153; 713/154; 713/193; 709/216; 709/229; 709/239; 726/2; 726/3; 726/4; 726/27; 726/28; 726/29; 726/30; 380/28; 380/29; 380/30

(58) Field of Classification Search .................. 713/193, 713/150–154; 726/2–3, 11–15, 27–30; 711/3, 711/203, 145
See application file for complete search history.

(56) References Cited

U.S. PATENT DOCUMENTS

| | | | |
|---|---|---|---|
| 1,310,719 A | 7/1919 | Vernam | |
| 4,262,329 A | 4/1981 | Bright et al. | |
| 4,558,176 A | 12/1985 | Arnold et al. | |
| 4,757,533 A | 7/1988 | Allen et al. | |
| 5,065,429 A | 11/1991 | Lang | |
| 5,150,407 A | 9/1992 | Chan | |
| 5,161,193 A | 11/1992 | Lampson | |
| 5,175,766 A | 12/1992 | Hamiton | |
| 5,185,717 A | 2/1993 | Mori | |
| 5,235,641 A | 8/1993 | Nozawa et al. | |
| 5,265,159 A | 11/1993 | Kung | |
| 5,677,952 A | 10/1997 | Blakeley, III et al. | |
| 5,687,237 A | 11/1997 | Naclerio | |
| 5,754,651 A | 5/1998 | Blatter et al. | |
| 5,870,468 A | 2/1999 | Harrison | |
| 5,931,947 A | 8/1999 | Burns | |
| 5,933,498 A | 8/1999 | Schneck et al. | |
| 5,940,507 A | 8/1999 | Cane et al. | |
| 6,073,237 A | 6/2000 | Ellison | |
| 6,134,660 A | 10/2000 | Boneh et al. | |
| 6,212,600 B1 | 4/2001 | Friedman et al. | |
| 6,249,866 B1 | 6/2001 | Brundrett | |
| 6,345,101 B1 | 2/2002 | Shukla | |
| 6,356,941 B1 | 3/2002 | Cohen | |
| 6,405,315 B1 | 6/2002 | Burns et al. | |
| 6,414,884 B1 | 7/2002 | DeFelice et al. | |

(Continued)

FOREIGN PATENT DOCUMENTS

WO  WO-00/52875 A1  9/2000

OTHER PUBLICATIONS

Wilson et al. NPL document "An Ethernet Based Data Storage Protocol for Home Network", 2004.*

(Continued)

*Primary Examiner* — Taghi Arani
*Assistant Examiner* — Josnel Jeudy
(74) *Attorney, Agent, or Firm* — Cesari and McKenna, LLP

(57) ABSTRACT

An iSCSI name forwarding technique allows a security appliance to assume iSCSI names of one or more clients and one or more storage systems in a network. The security appliance is coupled between each client and storage system, and is configured to intercept a data access request issued by the client that is destined for the storage system. Each iSCSI name of the storage system is an iSCSI target name associated with secure storage, i.e., a cryptainer, served by the storage system, whereas the iSCSI name of the client is an iSCSI initiator name of the network entity, i.e., the client, which initiates the data access request to access data stored on the cryptainer.

20 Claims, 6 Drawing Sheets

U.S. PATENT DOCUMENTS

| | | | |
|---|---|---|---|
| 6,507,911 | B1 | 1/2003 | Langford |
| 6,550,011 | B1 | 4/2003 | Sims, III |
| 6,625,734 | B1 | 9/2003 | Marvit et al. |
| 6,636,966 | B1 | 10/2003 | Lee et al. |
| 6,684,222 | B1 | 1/2004 | Cornelius et al. |
| 6,708,272 | B1 | 3/2004 | McCown et al. |
| 6,735,693 | B1 | 5/2004 | Hamlin |
| 6,754,827 | B1 | 6/2004 | Cane et al. |
| 6,792,544 | B2 | 9/2004 | Hashem |
| 6,839,437 | B1 | 1/2005 | Crane et al. |
| 6,851,056 | B2 | 2/2005 | Evans |
| 6,857,076 | B1 | 2/2005 | Klein |
| 6,915,435 | B1 | 7/2005 | Merriam |
| 7,003,674 | B1 | 2/2006 | Hamlin |
| 7,020,779 | B1 | 3/2006 | Sutherland |
| 7,093,127 | B2 | 8/2006 | McNulty et al. |
| 7,096,355 | B1 | 8/2006 | Marvit et al. |
| 7,136,995 | B1 | 11/2006 | Wann |
| 7,185,192 | B1 | 2/2007 | Kahn |
| 7,215,771 | B1 | 5/2007 | Hamlin |
| 7,240,197 | B1 | 7/2007 | Yamagami et al. |
| 7,260,724 | B1 | 8/2007 | Dickinson et al. |
| 7,529,884 | B2 * | 5/2009 | Nakatsuka et al. ........... 711/112 |
| 7,783,898 | B2 | 8/2010 | Detrick et al. |
| 2001/0054155 | A1 | 12/2001 | Hagan et al. |
| 2002/0073324 | A1 | 6/2002 | Hsu |
| 2002/0091935 | A1 | 7/2002 | Smith et al. |
| 2002/0114453 | A1 | 8/2002 | Bartholet et al. |
| 2003/0028765 | A1 | 2/2003 | Cromer et al. |
| 2003/0105830 | A1 * | 6/2003 | Pham et al. .................... 709/216 |
| 2003/0152036 | A1 * | 8/2003 | Brown et al. ................. 370/252 |
| 2004/0153642 | A1 | 8/2004 | Plotkin |
| 2004/0260768 | A1 * | 12/2004 | Mizuno ......................... 709/203 |
| 2005/0256972 | A1 * | 11/2005 | Cochran et al. ............... 709/245 |
| 2006/0265515 | A1 * | 11/2006 | Shiga et al. ................... 709/238 |
| 2007/0058801 | A1 | 3/2007 | Plotkin |
| 2007/0174634 | A1 | 7/2007 | Plotkin |

OTHER PUBLICATIONS

Anderson et al., "The Steganographic File System," Information Hiding, Second International Workshop, IH '98 Portland, Oregon. USA, Apr. 14-17, 1998, Proceedings, pp. 73-82, 1998.

Antonelli, et al., "The Packet Vault: Secure Storage of Network Data," CITI Technical Report 98-5, pp. 1-15, Jun. 25, 1998.

Blaze, "Oblivious Key Escrow," Information Hiding, First International Workshop, Cambridge, UK, May 3D-Jun. 1, 1996, Proceedings, pp. 335-343, 1996.

Blaze, "A cryptographic File System for Unix," Proceedings of the First ACM Conference on Computer and Communications Security, pp. 9-16 (1993).

Blaze, "Key Management in an Encrypting File System," USENIX Summer 1994 Technical Conference, pp. 27-35, (Jun. 6-10, 1994).

Boneh, et al., "A Revocable Backup System," In Proceedings 6th USENIX Security Conference, pp. 91-96, 1996.

Cattaneo, et al. "The Design and Implementation of a Transparent Cryptographic Filesystem for UNIX," Proceedings of The FREENIX Track: 2001 UNIX Annual Technical Conference. pp. 199-212 (Jun. 25-30, 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—EUROCRYPT '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes," IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email-Company Business and Marketing," Edge: Work-Group Computing Report, http://findarticles.com/p/articJes/mLmOWUB/is_0cU 1/aL 56260487/print (Oct. 11, 1999).

Double, "Encryption Key Security by Electric Field Destruction of Memory Cells," IBM Technical Disclosure Bulletin, pp. 8-11, Jan. 1989.

FIPS Pub 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS Pub 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D, No. 3, pp. 1284-1285 (Aug. 1987).

Garfinkel, S., "PGP: Pretty Good Privacy," O'Reilly & Associates, pp. 43, 54-55, 65-67, 151-153, Jan. 1995.

Garfinkel, S., "Omniva's Self-Destructing Email," Web Security, Privacy and Commerce, Second Edition, O'Reilly & Associates, Inc., Sebastopol, CA, pp. 280-283, Jan. 2002.

Gobioff, Howard, et al., "Security for Networked Attached Storage Devices," Carnegie Mellon University Computer Science Technical Report CMU-CS-97-185, Oct. 1997, 20 pages.

Gobioff, Howard, "Security for a High Performance Commodity Storage Subsystem," Carnegie Mellon University Computer Science Technical Report CMU-CS-99-160, Jul. 1999, 222 pages.

Gobioff, Howard, et al., "Smart Cards in Hostile Environments," Proceedings of the Second USENIX Workshop on Electronic Commerce, pp. 23-28 (Nov. 18-21. 1996).

Graham, et al, "Data Protection at the Volume Level," IBM Technical Disclosure Bulletin, pp. 146-148, Oct. 1988.

Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).

Hwang, et al., "An Access Control Scheme Based on Chinese Remainder Theorem and Time Stamp Concept," Computers & Security, vol. 15. No. 1. pp. 73-81, 1996.

IBM Crypto Server Management General Information Manual, First Edition (May 2000), 16 pages.

IBM SecureWay Cryptographic Products IBM 4758 PCI Cryptographic Coprocessor Installation Manual, Security Solutions and Technology Department, Second Edition (Mar. 2000), 34 pages.

IBM SecureWay, UltraCypher Cryptographic Engine (Datasheet) (1998), 2 pages.

IBM 4758 PCI Cryptographic Coprocessor Custom Software Installation Manual, Second Edition, Jan. 2001, 30 pages.

Avoid Litigation: Encrypt Your Data, InfoTech Research Group, Sep. 19, 2006, 6 pages.

Johnson et al., "Self-Destructing Diskette," IBM Technical Disclosure Bulletin, vol. 33, No. 1A, pp. 218-219 (Jun. 1990).

Mallett, "Considerations for Applying Disk Encryptors 10 Environments Subject to Hostile Overrun," IEEE, pp. 218-222, 1991.

Mauriello, "TCFS: Transparent Cryptographic File system," LINUX Journal, Aug. 1,1997, 8 pages.

Menezes et al., "Handbook of Applied Cryptography," CRC Press, Section 13.7.1, 4 pages, 1997.

Moore, "Preventing Access to a Personal Computer," IBM Technical Disclosure Bulletin, pp. 98-100, Sep. 1992.

Omniva Policy Systems, www.omniva.com, (Aug. 2004), downloaded from web.archive.org on Aug. 24, 2004, 19 pages.

Provos, Niels, "Encrypting Virtual Memory," CITI Technical Report 00-3, Center for Information Technology Integration, University of Michigan, Apr. 25, 2000, 11 pages.

Scherzer. "Memory Protection in Chip Cards," IBM Technical Disclosure Bulletin, pp. 416-417, Oct. 1989.

Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.

Slusarczuk et al., "Emergency Destruction of Information Storage Media," Institute for Defense Analysis, IDA Report R-321 , Dec. 1987, 196 pages.

Smith, "Verifying Type and Configuration of an IBM 4758 Device: A While Paper," IBM T.J. Watson Research Center pp. 1-7 (2I8/00).

Smith et al., "IBM Research Report: Building a High-Performance, Programmable Secure Coprocessor," IBM Research Division, Computer Science/Mathematics, RC 21102(94393) (Feb. 19, 1998), 61 pages.

Stinson, Douglas R., "Cryptography: Theory and Practice," CRC Press, Mar. 1, 1995, 228 pages.

Vernam, "Cipher Printing Telegraph Systems for Secret Wire and Radio Telegraphic Communications," Journal of the AI EE. pp. 109-115, Feb. 1926.

Weingart, "Physical Security for the uABYSS System," Proceedings 1987 IEEE Symposium on Security and Privacy, pp. 2-58 (Apr. 27-29, 1987), pp. 52-58.

Whitten et al., "Usability of Security: A Case Study," CMU Computer Science Technical Report CMU-CS-98-155. pp. 1-39, Dec. 18, 1998.

Yee et al., "Secure Coprocessors in Electronic Commerce Applications," Proceedings of the First USENIX Workshop of Electronic Commerce, pp. 155-170, Jul. 11-12, 1995.

Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).

Zadok et al., "Cryptfs: A Stackable Vnode Level Encryption File System," Computer Science Department, Columbia University, CUCS-021-98, pp. 1-14, Jun. 1998.

Supplementary European Search Report, European Application No. 02734438.1-2212/ 1388061, PCT/US0215421, Applicant: Decru, Inc., Date of Mailing: Oct. 6, 2010, pp. 1-5.

Plotkin et al., "Encryption Based Security System for Network Storage", U.S. Appl. No. 60/292,088, filed May 17, 2001, 28 pages.

J. Satran et al. *Request for Comment (RFC)* 3720 Internet Small Computer Systems Interface (iSCSI), Apr. 2004.

Tatenbaum, Andrew S., *Computer Networks*, 3$^{rd}$ Edition, Pretice Hall PTR, Upper Saddle River, NJ, 1996, pp. 521-542.

\* cited by examiner

ISCSI NAME FORWARDING TECHNIQUE

CROSS-REFERENCE TO RELATED APPLICATION

The present invention is related to the following commonly assigned U.S. patent application Ser. No. 10/478,386 titled, Encryption Based Security System for Network Storage, filed May 14, 2003, which application is hereby incorporated by reference.

FIELD OF THE INVENTION

The present invention relates to security appliances, and more specifically, to an iSCSI name forwarding technique that allows a security appliance to assume iSCSI names of one or more clients and one or more storage systems in a network.

BACKGROUND OF THE INVENTION

A storage system is a computer that provides storage service relating to the organization of information on writable persistent storage devices, such as memories, tapes or disks. The storage system may be deployed within a storage area network (SAN) and configured to operate according to a client/server model of information delivery to thereby allow many client systems (clients) to access the information stored on the storage system. Each client may comprise an application executing on a computer that "connects" to the storage system over a computer network, such as a point-to-point link, shared local area network, wide area network or virtual private network implemented over a public network, such as the Internet.

The clients generally utilize block-based access protocols, such as the Small Computer Systems Interface (SCSI) protocol, when accessing information over a SAN-based network. SCSI is a peripheral input/output (I/O) interface with a standard, device independent protocol that allows different peripheral devices, such as disks, to attach to a storage system. In SCSI terminology, clients operating in a SAN environment are "initiator" nodes that initiate commands and requests to access data. The storage system is thus a "target" node configured to respond to the data access requests issued by the initiators in accordance with a request/response protocol. In such a SAN deployment, the client requests (and storage system responses) address the information in terms of block addressing on disk using, e.g., a logical unit number (lun).

A SAN is a high-speed network that enables establishment of direct connections between the storage system and its storage devices. The SAN may thus be viewed as an extension to a storage bus and, as such, an operating system of the storage system enables access to stored data using block-based access protocols over the "extended bus". In this context, the extended bus may be embodied as Ethernet media adapted to operate with additional block access protocols, such as the SCSI protocol encapsulation over the Transmission Control Protocol/Internet Protocol (TCP/IP), hereinafter referred to as the iSCSI protocol. The iSCSI protocol is well-known and described in detail in J. Satran et al., *Request For Comment (RFC) 3720*, titled, *Internet Small Computer Systems Interface (iSCSI)*, April 2004, which is hereby incorporated by reference as though fully set forth herein.

Broadly stated, the iSCSI protocol is embodied as iSCSI requests and responses that enable communication between initiator and target nodes over one or more TCP connections. The iSCSI protocol is typically implemented by an iSCSI layer of a protocol stack on each node. The network protocol stack comprises layers of software, such as a transport layer and a network layer. The IP protocol is a network layer protocol that provides network addressing between the nodes, whereas the transport layer provides a port service that identifies processes executing on the nodes and creates a connection between those processes that indicate a willingness to communicate. Examples of conventional transport layer protocols include the TCP protocol.

The connection provided by the transport layer, such as TCP, is a reliable, securable logical circuit between pairs of processes. A TCP process executing on each node establishes the TCP connection in accordance with a conventional "3-way handshake" arrangement involving the exchange of TCP message or segment data structures. The resulting TCP connection is identified by TCP port numbers and IP addresses of the nodes. The TCP protocol and establishment of a TCP connection are described in *Computer Networks, 3rd Edition*, particularly at pgs. 521-542, which is hereby incorporated by reference as though fully set forth herein. Once established, each TCP connection is configured to carry control messages, SCSI commands, and data within iSCSI protocol data units (PDUs). An iSCSI process of the iSCSI layer builds/receives the iSCSI PDUs and relays/receives them to/from one or more established TCP connections; the group of TCP connections that link an initiator with a target form an iSCSI session.

Each iSCSI node, e.g., initiator or target, has an iSCSI name. The initiator presents its iSCSI initiator name and the iSCSI target name to which it wishes to connect in an initial Login request to establish a new iSCSI session or connection. However, when performing iSCSI discovery, the iSCSI initiator name is required, but the iSCSI target name may be omitted, primarily because iSCSI discovery is often used for target discovery. Typically, the target accepts a specific discovery request (PDU) issued by the initiator that requests relevant information about the target. In response, the target returns all path information (e.g., iSCSI target name and IP address-TCP port pairs) for specific targets, e.g., storage, which the initiator is authorized to access.

A network environment may be provided wherein information (data) is stored in secure storage served by one or more storage systems coupled to one or more security appliances. Each security appliance is embodied as a standalone computer that is inserted between each client and storage system, and that intercepts data access requests and responses exchanged between the client and storage system over the network. Specifically, the security appliance is configured to transform unencrypted data (cleartext) generated by clients (or initiators) into encrypted data (ciphertext) destined for secure storage or "cryptainers" on the storage system (or target). As used herein, a cryptainer is a logical construct comprising physical storage on a storage device, such as a disk, in which the encrypted data is stored. In the context of a SAN environment, a cryptainer can be, e.g., a disk, a region on the disk or several regions on one or more disks that, in the context of a SAN protocol such as iSCSI, is accessible as a lun.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

In the network environment described above, each client and storage system may have one or more iSCSI names, wherein the iSCSI names of the storage system may be associated with, e.g., different cryptainers served by the storage system. Therefore, communication between the client and storage system involves management of a plurality of iSCSI names. Since it is embodied as a standalone computer between the client and storage system, the security appliance may be required to manage additional iSCSI names. This is primarily because the storage system "views" the security appliance as a new client, whereas the client views the security appliance as a new storage system (or new storage device). Consequently, insertion of the security appliance between the client and storage system without further iSCSI name mapping/configuration may render the environment inoperable.

A conventional solution to this problem is to configure the security appliance with a new iSCSI initiator name so that the storage system can recognize the security appliance. In addition, the security appliance is configured with one or more new iSCSI target names so that the client can recognize the security appliance. However this is a complicated and costly solution that requires management of a large number of iSCSI names at the security appliance.

SUMMARY OF THE INVENTION

The disadvantages of the prior art are overcome by providing an iSCSI name forwarding technique that allows a security appliance to assume iSCSI names of one or more clients and one or more storage systems in a network. The security appliance is coupled between each client and storage system, and is configured to intercept a data access request issued by the client that is destined for the storage system. Each iSCSI name of the storage system is an iSCSI target name associated with secure storage, i.e., a cryptainer, served by the storage system, whereas the iSCSI name of the client is an iSCSI initiator name of the network entity, i.e., the client, which initiates the data access request to access data stored on the cryptainer.

Broadly stated, the security appliance intercepts a first discovery request issued by the client and destined to the storage system that requests all iSCSI target names exported by the system to the client. The security appliance extracts the iSCSI initiator name from the request and stores that name in an internal iSCSI name mapping table. The security appliance then queries the storage system with a second discovery request to retrieve the iSCSI target names exported to the client (using the extracted iSCSI initiator name) and populates the iSCSI mapping table with those names. Thereafter, the security appliance forwards the exported iSCSI target names to the client, thereby essentially advertising (presenting) itself as the storage accessible by the client.

Subsequently, the client selects an exported iSCSI target name, generates an initial login request directed to the selected target name and attempts to login to the storage system to access the cryptainer associated with that name. The security appliance intercepts the initial login request and uses the selected iSCSI target name to log into the storage system on behalf of the client. Notably, the security appliance utilizes the iSCSI initiator and target names to identify the client and cryptainer served by the storage system. Advantageously, the present invention obviates any need for reconfiguration of the iSCSI names used in the iSCSI protocol.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
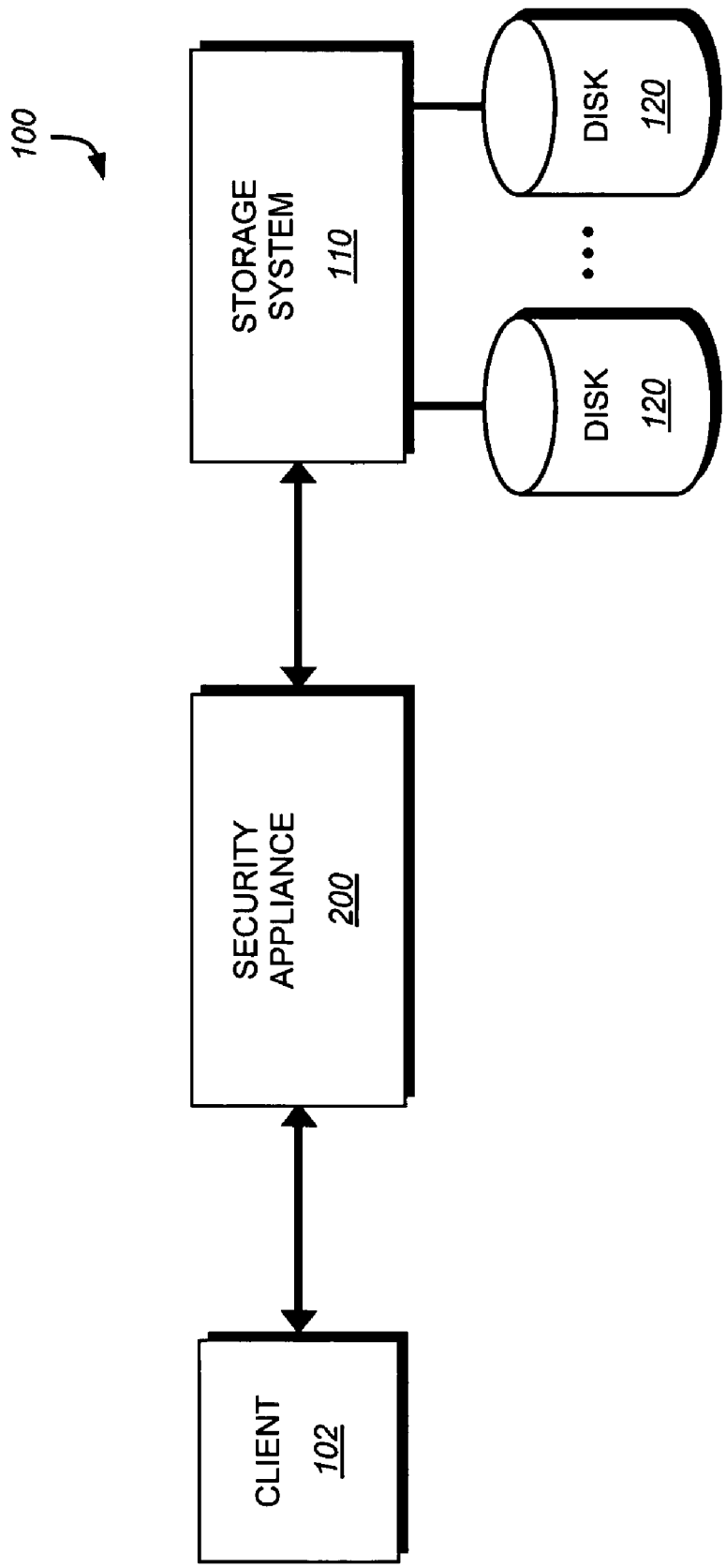
FIG. 1 is a schematic block diagram of an environment including a multi-protocol security appliance that may be advantageously used with the present invention.

FIG. 1 is a schematic block diagram of an environment 100 including a multi-protocol security appliance 200 that may be advantageously used with the present invention. The security appliance 200 is coupled between one or more clients 102 and one or more storage systems 110, such as an application server or filer. The security appliance 200, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

In the illustrative embodiment, the security appliance employs a conventional encryption algorithm, e.g., the Advanced Encryption Standard (AES) or other suitable algorithms, to transform unencrypted data (cleartext) generated by the clients 102 into encrypted data (ciphertext) intended for secure storage, i.e., one or more cryptainers, on the storage system 110. To that end, the security appliance illustratively uses a high-quality, software or hardware-based pseudo random number generation technique to generate encryption keys. The encryption and decryption operations are performed using these encryptions keys, such as a cryptainer key associated with each cryptainer. As described herein, the security appliance 200 uses an appropriate cryptainer key to encrypt or decrypt portions of data stored in a particular cryptainer.

Figure 2:
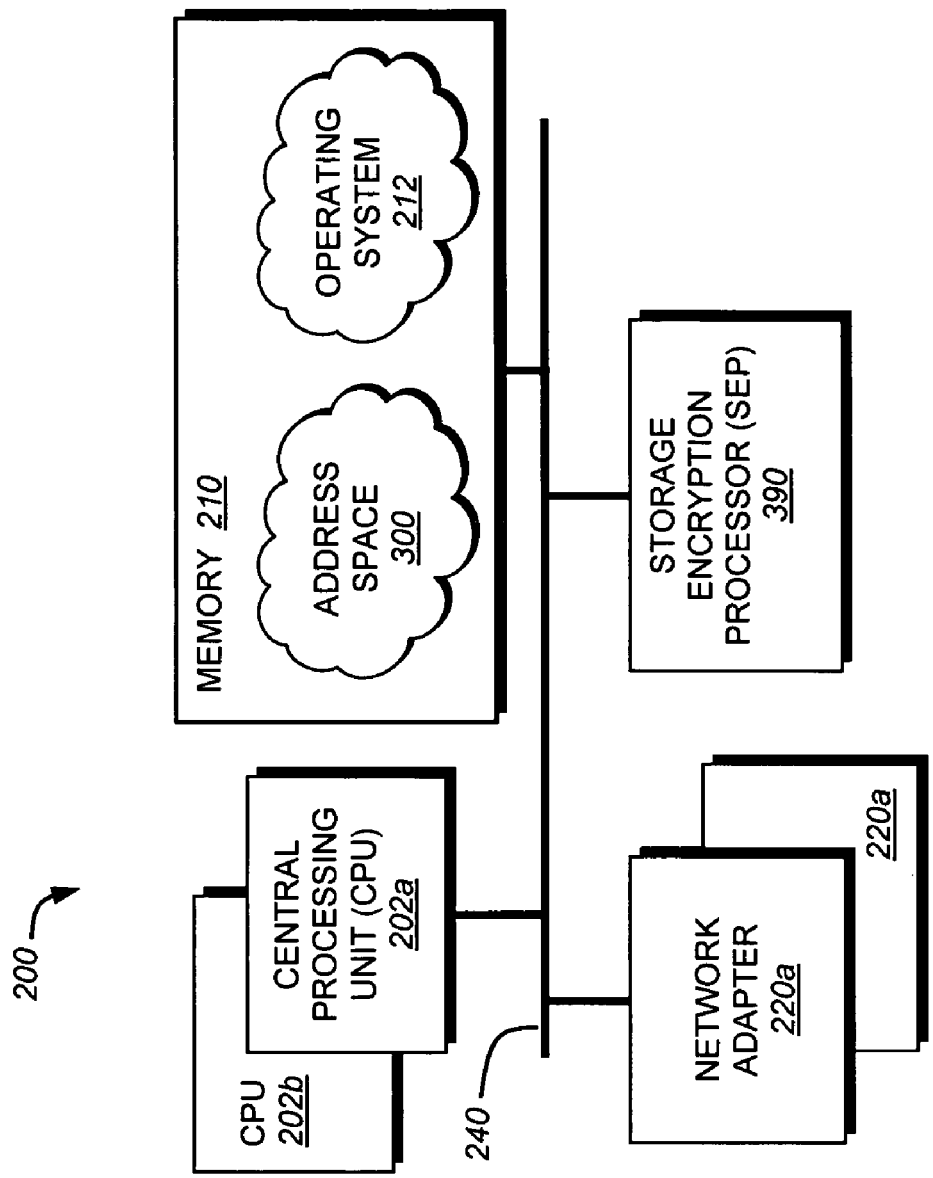
FIG. 2 is a schematic block diagram of the multi-protocol security appliance that may be advantageously used with the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 220a,b), a memory 210, one or more network adapters 220a,b, and a storage encryption processor (SEP 390) interconnected by a system bus 240, such as a conventional Peripheral Component Interconnect (PCI) bus. The SEP 390 is configured to perform all encryption and decryption operations for the security appliance in a secure manner; for example, the SEP is configured to protect plaintext encryption keys from system software executing on each CPU 202. Accordingly, the SEP is illustratively embodied as a FIPS 140-2 level-3 certified module that is connected to a dedicated interface card or other similar card.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Figure 3:
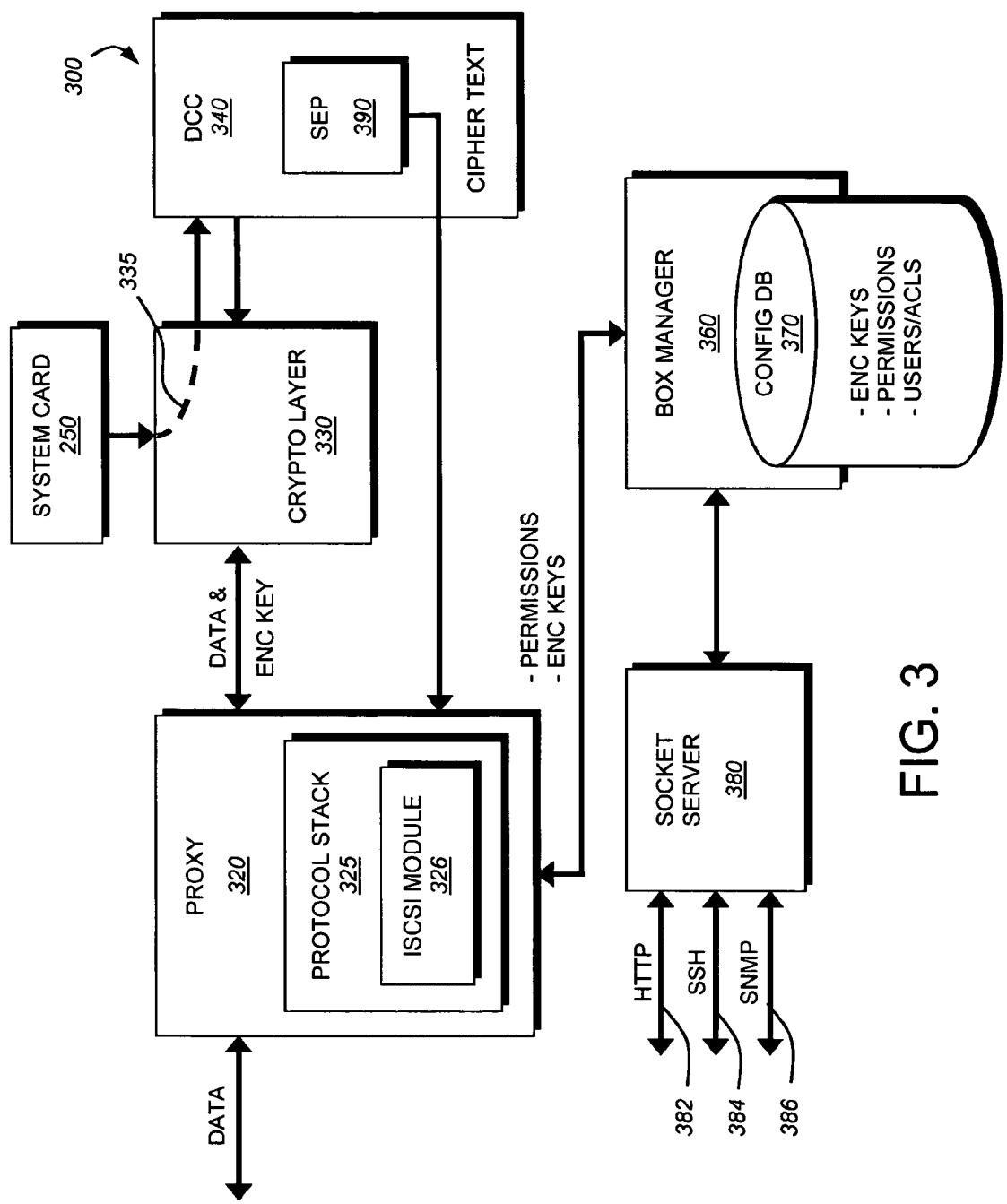
FIG. 3 is a schematic diagram illustrating an arrangement of software processes and modules executing on the security appliance in accordance with the present invention.

The operating system 212 illustratively organizes the memory 210 into an address space arrangement available to the software processes and modules executing on the processors. FIG. 3 is a schematic diagram illustrating an arrangement 300 of software processes and modules executing on the security appliance 200 in accordance with the present invention. In the illustrative embodiment, the operating system software is a customized version of a Unix type operating system, although other operating systems may be used, such as Linux and/or Microsoft Windows bases operating systems.

For both NAS and SAN environments, data is received at a proxy 320 of the security appliance. The proxy 320 is illustratively embodied as, e.g., the network protocol stack 325 configured to interpret the protocol over which data is received and to enforce certain access control rules based on one or more policies. An example of such a protocol is the iSCSI protocol, which is illustratively implemented by an iSCSI (module) layer 326 of the protocol stack 325. Each policy is served by a box manager 360 that is illustratively embodied as a database application process configured to manage a configuration repository or database (Config DB 370) that stores permissions, access control lists (ACLs), system-wide settings and encrypted keys. A socket server 380 provides interfaces to the box manager 360, including (i) an HTTP web interface 382 embodied as, e.g., a graphical user interface (GUI) adapted for web-based administration, (ii) a SSH interface 384 for command line interface (CLI) command administration, and (iii) an SNMP interface 386 for remote management and monitoring.

Notably, the security appliance 200 "virtualizes" storage such that, to a client 102, the appliance appears as a storage system 110 whereas, from the perspective of the storage system, the security appliance appears as a client. Such virtualization requires that security appliance manipulate (IP) addresses with respect to data access requests and responses. Illustratively, certain of the customizations to the network protocol stack of the proxy 320 involve virtualization optimizations provided by the appliance. For example, the security appliance 200 manipulates (changes) the source and destination IP addresses of the data access requests and responses. In the illustrative embodiment, the encrypted key, e.g., a cryptainer key, exchanged between the proxy 320, box manager 360 and crypto layer 330 is encrypted by a domain key.

The present invention is directed to an iSCSI name forwarding technique that allows a security appliance to assume iSCSI names of one or more clients and one or more storage systems in a network. As noted, the security appliance is coupled between each client and storage system, and is configured to intercept a data access request issued by client that is destined for the storage system. Each iSCSI name of the storage system is an iSCSI target name associated with secure storage, i.e., a cryptainer, served by the storage system. The iSCSI name of the client is an iSCSI initiator name of the network entity, i.e., the client, which initiates the data access request to access data stored on the cryptainer.

Figure 4:
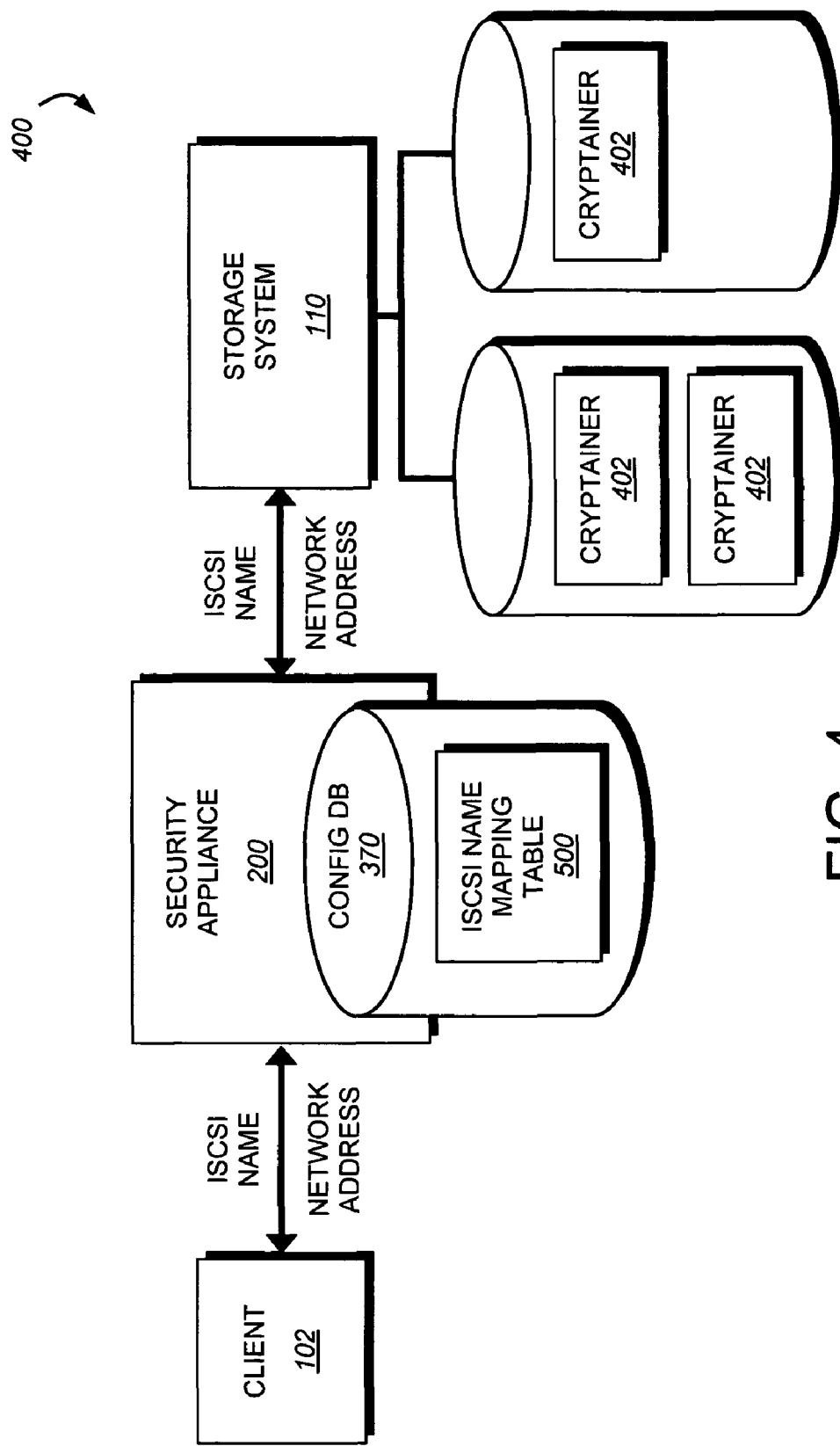
FIG. 4 is a schematic block diagram illustrating a network environment adapted to implement an iSCSI name forwarding technique in accordance with the present invention.

FIG. 4 is a schematic block diagram illustrating a network environment 400 adapted to implement the iSCSI name forwarding technique in accordance with the present invention. The network environment 400 is illustratively a SAN environment that includes a client 102 coupled to a storage system 110 via a security appliance 200. The client and storage system communicate using the iSCSI protocol to thereby enable the client to access data stored on cryptainers 402 served by the storage system. Similar to the security appliance 200, both the client and storage system include protocol stacks, each of which includes an iSCSI module to enable such communication.

Figure 5:
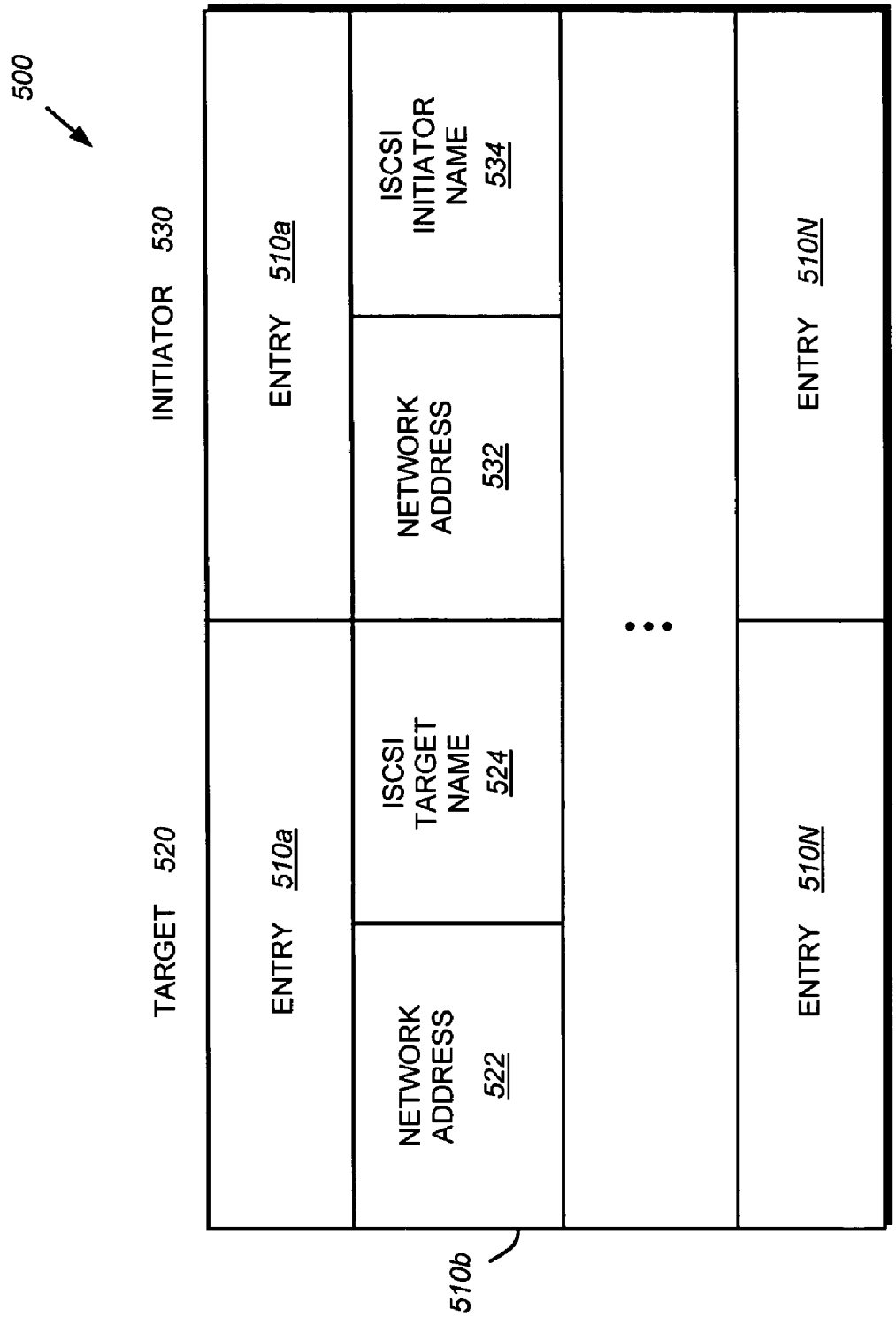
FIG. 5 is a schematic block diagram illustrating an iSCSI mapping table that may be advantageously used with the present invention.

Broadly stated, the security appliance 200 intercepts a first discovery request issued by the client 102 and destined to the storage system 110 that requests all iSCSI target names exported by the system to the client. Such a discovery request may be a conventional iSCSI discovery request. The security appliance extracts the iSCSI initiator name from the request and stores that name in an internal iSCSI name mapping table 500. The security appliance 200 then queries the storage system 110 with a second discovery request to retrieve the iSCSI target names exported to the client (using the extracted iSCSI initiator name) and populates the iSCSI mapping table 500 with those names, e.g., in a table as shown in FIG. 5.

Thereafter, the security appliance forwards the exported iSCSI target names to the client, thereby essentially advertising (presenting) itself as the storage accessible by the client.

Subsequently, the client selects an exported iSCSI target name, generates an initial login request directed to the selected target name and attempts to login to the storage system to access the cryptainer 402 associated with that name. The security appliance intercepts the initial login request and uses the selected iSCSI target name to log into the storage system on behalf of the client. Notably, the security appliance 200 utilizes the iSCSI initiator and target names to identify the client 102 and cryptainer 402 served by the storage system 110. Advantageously, the novel iSCSI name forwarding technique obviates any need for reconfiguration of the iSCSI names used in the iSCSI protocol, i.e., configuring the client, storage system and security appliance with appropriate iSCSI names and mappings.

In the illustrative embodiment, the iSCSI name forwarding technique is implemented as a two-stage login procedure. In a first stage, the security appliance 200 intercepts the first discovery request issued by the client 102 to establish an iSCSI discovery session with the storage system 110. To that end, the discovery request is a discovery protocol data unit (PDU) that includes an iSCSI initiator name and network (IP) address of the client, and that requests all iSCSI target names exported by the storage system which the initiator (client) is authorized to access. The security appliance extracts the iSCSI initiator name and IP address from the first request, creates the iSCSI mapping table and populates it with the name and address, and stores that table in its configuration database 370.

The security appliance 200 then generates a second discovery request that includes the iSCSI initiator name and forwards that request to the storage system 110 to establish an iSCSI discovery session that requests those iSCSI target names and other relevant information. In response, the storage system returns path information (e.g., iSCSI target name and IP address-TCP port pairs) for the storage, e.g., cryptainers 602, which the initiator is authorized to access. The security appliance intercepts the discovery response, extracts the exported iSCSI names and IP addresses, and populates the iSCSI name mapping table 700 with those names and addresses. The security appliance then forwards the exported iSCSI names and IP addresses to the client, while presenting itself as the storage accessible by the client. Such forwarding of data occurs within the previously opened iSCSI connection, thereby providing a secure communication pathway between the client and the security appliance.

In the second stage of login, the client selects an exported iSCSI target name and generates a first initial login request that includes the iSCSI initiator and target names. In accordance with a login phase of the iSCSI protocol, the client then attempts to login to the storage system using the first initial login request to establish an iSCSI session for purposes of accessing the cryptainer 402 associated with the target name. The security appliance intercepts the request and uses the selected iSCSI target name and iSCSI initiator name to generate a second initial login request directed to the storage system. This login request enables the security appliance to log into the storage system on behalf of the client to thereby establish an iSCSI session between the appliance (on behalf of the client) and the storage system in accordance with a full feature phase of the iSCSI protocol.

The storage system 110 thereafter responds to the login request by returning a final login response which transitions the session to the full feature phase. This final response includes a session ID (SSID) that identifies the session. Subsequently, the client sends data access requests to the storage system using the SSID. The security appliance intercepts those data access requests and forwarded them to the storage system, e.g., without the need for iSCSI name mappings. Advantageously, the novel iSCSI name forwarding technique is transparent to the client and storage system.

Further to the illustrative embodiment, the iSCSI module 326 of the proxy 320 on the security appliance 200 cooperates with corresponding iSCSI modules on protocol stacks of the client and storage system to acquire the iSCSI names of the client and storage system, respectively, and to utilize the acquired iSCSI names to access storage served by the storage system on behalf of the client. The iSCSI module 326 of the proxy then assembles those names into a format for use by the box manager 360 when creating the iSCSI name mapping table 500. The mapping table 700 is updated periodically (e.g., every ten minutes) in accordance with the iSCSI protocol, wherein the updates are illustratively made to the table in memory and then written to the configuration database 370 by the box manager 360.

FIG. 5 is a schematic block diagram illustrating the iSCSI name mapping table 500 that may be advantageously used with the present invention. The mapping table 500 includes one or more entries 510*a-n*, each of which is organized as a target section 520 and an initiator section 530. The target section 520 comprises a network address field 522 containing a network (IP) address of the storage system 110 and an iSCSI target name field 524 containing an iSCSI target name of storage, e.g., a cryptainer 602, served by the storage system. Likewise, the initiator section 530 comprises a network address field 532 containing a network (IP) address of the client 102 and an iSCSI initiator name field 534 containing an iSCSI initiator name of the client.

Figure 6:
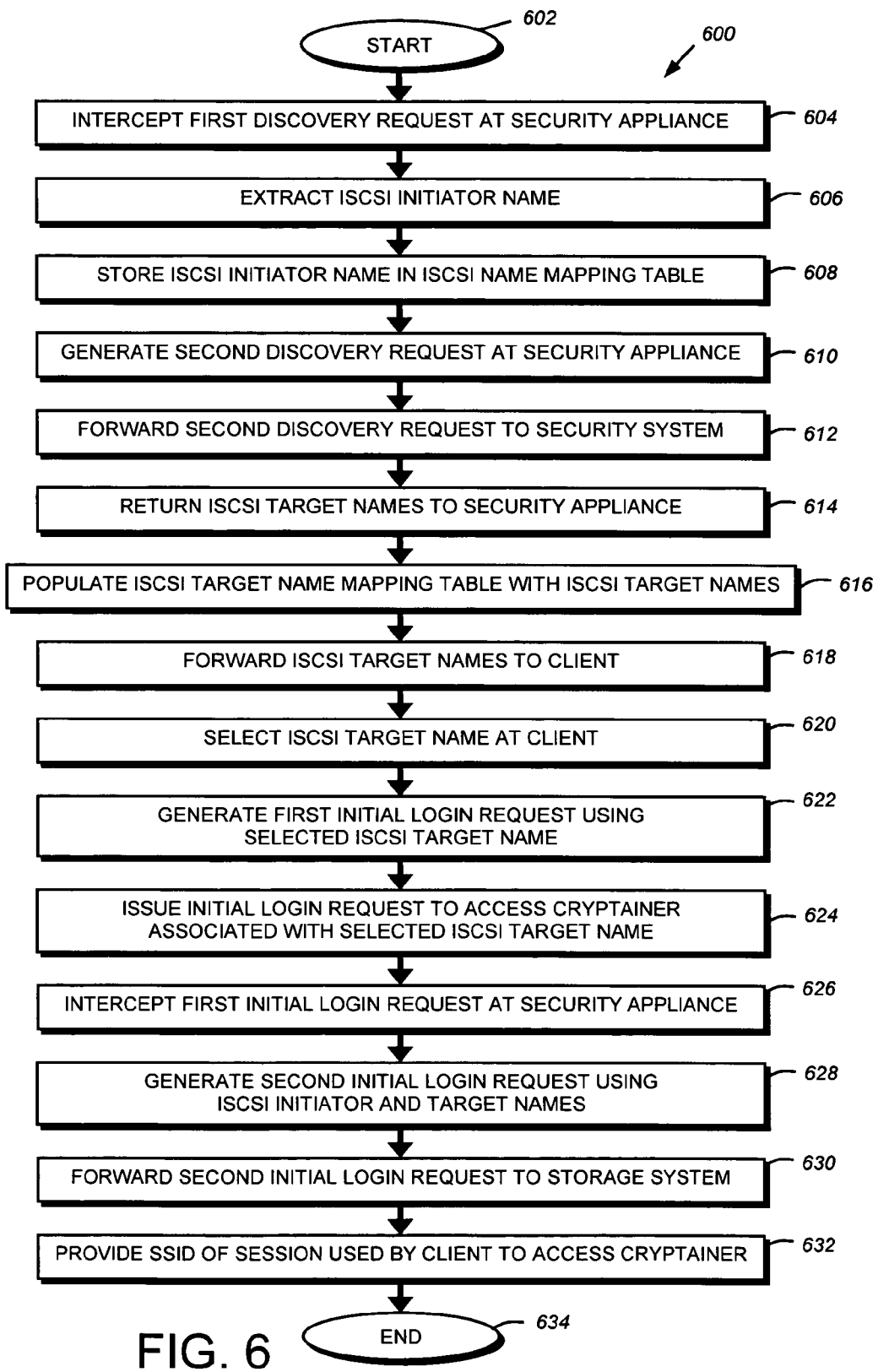
FIG. 6 is a flowchart illustrating a procedure for implementing the iSCSI name forwarding technique in accordance with the present invention.

FIG. 6 is a flowchart illustrating a procedure for implementing the iSCSI name forwarding technique in accordance with the present invention. The procedure 600 starts at Step 602 and proceeds to Step 604 where the security appliance intercepts the first discovery request issued by the client to retrieve one or more iSCSI target names exported by the storage system that the client is authorized to access. In Step 606, the security appliance extracts the iSCSI initiator name from the request and, in Step 608, stores that name in an internal iSCSI mapping table. In Step 610, the security appliance generates the second discovery request using the iSCSI initiator name and, in Step 612, forwards that request to the storage system to retrieve the exported iSCSI target names requested by the client. In Step 614, the storage system returns the iSCSI target names and, in Step 616, the security appliance populates the iSCSI mapping table with those names. In Step 618, the security appliance forwards the iSCSI target names to the client.

In Step 620, the client selects an exported iSCSI target name and, in Step 622, generates a first initial login request directed to the selected target name. In Step 624, the client issues the initial login request to the storage system to access the cryptainer associated with that name. In Step 626, the security appliance intercepts the request and, in Step 628, generates a second initial login request directed to the storage system. As noted, this second initial login request includes the iSCSI initiator and target names to identify the client and cryptainer served by the storage system. In Step 630, the security appliance forwards the second initial login request to the storage system and, in Step 632, the storage system provides a SSID that identifies the session used by the client to send data access requests to access the cryptainer on the storage system. The procedure then ends at Step 634.

While there has been shown and described an illustrative embodiment of an iSCSI name forwarding technique that allows a security appliance to assume iSCSI names of one or more clients and one or more storage systems in a network, it is to be understood that various other adaptations and modifications may be made within the spirit and scope of the invention. For example, in an alternate embodiment, the novel iSCSI name mapping table may be embodied within a routing table of the security appliance. That is, the iSCSI client and storage names stored in the mapping table may comprise portions of one or more "virtual" routes that illustratively represent storage. A network (IP) routing table of the security appliance may include a plurality of entries, each of which comprises an initiator name (e.g., a client name), a target name (e.g., a storage name) and a server route identifier that cooperate to form a virtual route.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for allowing a security appliance, having a processor and a memory, to assume Internet Small Computer System Interface (iSCSI) names of one or more clients and one or more storage systems in a network, the method comprising:
   intercepting a first discovery request issued by a client at the security appliance configured to perform at least one of encrypting and decrypting data transmitted between the one or more clients and the one or more storage systems, the first discovery request destined to the storage system and configured to request iSCSI target names exported by the system to the client;
   extracting, by the security appliance, an iSCSI initiator name of the client from the first discovery request;
   storing, at the security appliance, the iSCSI initiator name, extracted from the first discovery request, in an iSCSI name mapping table of the security appliance;
   querying the storage system with a second discovery request issued by the security appliance to retrieve the iSCSI target names exported to the client;
   populating the iSCSI name mapping table with the exported iSCSI target names at the security appliance; and
   forwarding the exported iSCSI target names from the security appliance to the client, thereby presenting the security appliance as storage accessible by the client.

2. The method of claim 1 wherein the each iSCSI target name is associated with secure storage served by the storage system and wherein the iSCSI initiator name is associated with the client.

3. The method of claim 2 wherein the secure storage is a cryptainer.

4. The method of claim 3 further comprising:
   selecting an exported iSCSI target name at the client;
   generating an initial login request directed to the selected exported iSCSI target name, the initial login request enabling access to a cryptainer associated with the selected exported iSCSI target name; and
   intercepting the initial login request at the security appliance.

5. The method of claim 4 further comprising:
   using the selected exported iSCSI target name to enable the security appliance to log into the storage system on behalf of the client and access the cryptainer associated with the iSCSI target name.

6. The method of claim 5 wherein using comprises using the iSCSI initiator and target names to identify the client and the cryptainer served by the storage system.

7. A security appliance configured to assume Internet Small Computer System Interface (iSCSI) names of one or more clients and one or more storage systems in a network, the security appliance comprising:
   one or more network adapters configured to couple the security appliance to each client and storage system, where the security appliance is configured to perform at least one of encrypting data and decrypting data transmitted between the one or more clients and the one or more storage systems;
   a processor coupled to each network adapter and configured to execute software processes and modules; and
   a memory configured to store an iSCSI module configured to acquire the iSCSI names of a client and a storage system through interception of a first discovery request issued by the client and issuance of a second discovery request by the security appliance to the storage system, and a box manager process configured to create an iSCSI name mapping table for storing the acquired iSCSI names, the iSCSI module further configured to utilize the acquired iSCSI names to access storage served by the storage system on behalf of the client.

8. The security appliance of claim 7 wherein the iSCSI module is further configured to assemble the acquired iSCSI names into a format for use by the box manager process when creating the iSCSI name mapping table.

9. An apparatus configured to allow a security appliance, having a processor and a memory, to assume Internet Small Computer System Interface (iSCSI) names of one or more clients and one or more storage systems in a network, the apparatus comprising:
   means for extracting, by the security appliance, an iSCSI initiator name from a client issued first discovery request intercepted by the security appliance, wherein the security appliance is configured to perform at least one of encrypting data and decrypting data transmitted between the one or more clients and the one or more storage system;
   means for storing the extracted iSCSI initiator name in an iSCSI name mapping table of the security appliance;
   means for querying the storage system with a second discovery request issued by the security appliance to retrieve the iSCSI target names exported to the client and for populating the iSCSI name mapping table with the exported iSCSI target names at the security appliance; and
   means for forwarding the exported iSCSI target names from the security appliance to the client, thereby presenting the security appliance as storage accessible by the client.

10. The apparatus of claim 9 wherein the each iSCSI target name is associated with secure storage served by the storage system and wherein the iSCSI initiator name is associated with the client.

11. The apparatus of claim 10 wherein the secure storage is a cryptainer.

12. The apparatus of claim 11 further comprising:
means for selecting an exported iSCSI target name at the client;
means for generating an initial login request directed to the selected exported iSCSI target name, the initial login request enabling access to a cryptainer associated with the selected exported iSCSI target name; and
means for intercepting the initial login request at the security appliance.

13. The apparatus of claim 12 further comprising:
means for using the selected exported iSCSI target name to enable the security appliance to log into the storage system on behalf of the client and access the cryptainer associated with the iSCSI target name.

14. The apparatus of claim 13 wherein the means for using comprises means for using the iSCSI initiator and target names to identify the client and the cryptainer served by the storage system.

15. A non-transitory computer readable medium containing executable program instructions executed by a processor, comprising:
program instructions that intercept a first discovery request issued by a client at a security appliance, the first discovery request destined to a storage system and configured to request Internet Small Computer System Interface (iSCSI) target names exported by the storage system to the client, wherein the security appliance is configured to perform at least one of encrypting data and decrypting data transmitted between the client and the storage system;
program instructions that extract by the security appliance and store at the security appliance an iSCSI initiator name of the client from the request;
program instructions that query the storage system with a second discovery request issued by the security appliance to retrieve the iSCSI target names exported to the client; and
program instructions that forward the exported iSCSI target names from the security appliance to the client, thereby presenting the security appliance as storage accessible by the client.

16. The non-transitory computer readable medium of claim 15 wherein each iSCSI target name is associated with secure storage served by the storage system and wherein the iSCSI initiator name is associated with the client.

17. The non-transitory computer readable medium of claim 16 wherein the secure storage is a cryptainer.

18. The non-transitory computer readable medium of claim 17 further comprising:
program instructions that intercept an initial login request at the security appliance, the initial login request generated by the client and directed to an iSCSI target name selected by the client, the initial login request enabling access to the cryptainer associated with the selected iSCSI target name.

19. The non-transitory computer readable medium of claim 18 further comprising:
program instructions that use the selected iSCSI target name to enable the security appliance to log into the storage system on behalf of the client and access the cryptainer associated with the iSCSI target name.

20. The non-transitory computer readable medium of claim 19 wherein the program instructions that use the selected iSCSI target name to enable the security appliance to log into the storage systems comprise program instructions that use the iSCSI initiator and target names to identify the client and cryptainer served by the storage system.

* * * * *